United States Patent
Rapp

(10) Patent No.: US 9,715,487 B2
(45) Date of Patent: Jul. 25, 2017

(54) MULTI-LEVEL NAMING OF GROUPED DATA

(75) Inventor: Peter William Rapp, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 747 days.

(21) Appl. No.: 12/286,638

(22) Filed: Sep. 30, 2008

(65) Prior Publication Data

US 2010/0083081 A1    Apr. 1, 2010

(51) Int. Cl.
G06F 17/00    (2006.01)
G06F 17/24    (2006.01)
G06F 17/27    (2006.01)

(52) U.S. Cl.
CPC ........ *G06F 17/246* (2013.01); *G06F 17/2745* (2013.01)

(58) Field of Classification Search
CPC ..................................... G06F 17/246
USPC .................................. 715/212–220
See application file for complete search history.

(56) References Cited

U.S. PATENT DOCUMENTS

| | | | | |
|---|---|---|---|---|
| 5,987,481 A | * | 11/1999 | Michelman et al. | 715/219 |
| 6,199,080 B1 | * | 3/2001 | Nielsen | 715/206 |
| 6,411,313 B1 | * | 6/2002 | Conlon et al. | 715/769 |
| 6,442,575 B2 | * | 8/2002 | Pratley et al. | 715/212 |
| 7,143,339 B2 | * | 11/2006 | Weinberg et al. | 715/212 |
| 7,305,408 B2 | * | 12/2007 | Morris | |
| 7,549,116 B1 | * | 6/2009 | Garcowski et al. | 715/212 |
| 2001/0049699 A1 | * | 12/2001 | Pratley | G06F 17/245 715/212 |
| 2005/0120293 A1 | * | 6/2005 | Benhase et al. | 715/504 |
| 2006/0069696 A1 | * | 3/2006 | Becker et al. | 707/102 |
| 2008/0243823 A1 | * | 10/2008 | Baris et al. | 707/5 |
| 2009/0044090 A1 | * | 2/2009 | Gur et al. | 715/212 |

OTHER PUBLICATIONS

Joe Kraynak, Absolute Beginner's Guide to Microsoft Office Excel 2003, Sep. 11, 2003, Que p. 90.*
Robin Abraham and Martin Erwig, Header and Unit Inference for Spreadsheets Through Spatial Analyses, 2004, IEEE Computer Society, 8 pages.*

\* cited by examiner

*Primary Examiner* — Mohammed-Ibrahim Zuberi
(74) *Attorney, Agent, or Firm* — Fletcher Yoder PC

(57) ABSTRACT

Multi-level naming of grouped data is disclosed. In some embodiments, a specification of a plurality of levels of headers with respect to at least one dimension of a group of cells is received, and header cell values of header cells comprising the plurality of levels of headers are enabled to refer to one or more associated cells in the group of cells.

20 Claims, 6 Drawing Sheets

| | | North America | | | | Asia | | | |
|---|---|---|---|---|---|---|---|---|---|
| | | Marketing | | Distribution | | Marketing | | Distribution | |
| | | 2003 | 2004 | 2003 | 2004 | 2003 | 2004 | 2003 | 2004 |
| Cinemaniac | Film | 1 | 2 | 3 | 4 | 5 | 6 | 7 | 8 |
| | Internet | 9 | 10 | 11 | 12 | 13 | 14 | 15 | 16 |
| Beaker Studios | Film | 17 | 18 | 19 | 20 | 21 | 22 | 23 | 24 |
| | Internet | 25 | 26 | 27 | 28 | 29 | 30 | 31 | 32 |
| Jay Capella | Film | 33 | 34 | 35 | 36 | 37 | 38 | 39 | 40 |
| | DVD | 41 | 42 | 43 | 44 | 45 | 46 | 47 | 48 |

300

200 ⇾

|  | Apple | Orange | Pear |
|---|---|---|---|
| Health | 92 | 99 | 9 |
| Liberty | 21 | 49 | 27 |
| Happiness | 47 | 41 | 26 |
| Optimism | 56 | 62 | 75 |
| Well-Being | 83 | 9 | 16 |

|  | A | B | C | D |
|---|---|---|---|---|
| 1 |  | Apple | Orange | Pear |
| 2 | Health | 92 | 99 | 9 |
| 3 | Liberty 2 | 1 | 49 | 27 |
| 4 | Happiness | 47 | 41 | 26 |
| 5 | Optimism | 56 | 62 | 75 |
| 6 | Well-Being | 83 | 9 | 16 |

FIG. 2B

|  | Apple Orange | Pear |
|---|---|---|
| Health | 92      99 | 9 |
| Liberty | 21      49 | 27 |
| Happiness | 47      41 | 26 |
| Optimism | 56      62 | 75 |
| Well-Being | 83       9 | 16 |

|  |  | North America ||||  Asia ||||
|  |  | Marketing || Distribution || Marketing || Distribution ||
|  |  | 2003 | 2004 | 2003 | 2004 | 2003 | 2004 | 2003 | 2004 |
|---|---|---|---|---|---|---|---|---|---|
| Cinemaniac | Film | 1 | 2 | 3 | 4 | 5 | 6 | 7 | 8 |
|  | Internet | 9 | 10 | 11 | 12 | 13 | 14 | 15 | 16 |
| Beaker Studios | Film | 17 | 18 | 19 | 20 | 21 | 22 | 23 | 24 |
|  | Internet | 25 | 26 | 27 | 28 | 29 | 30 | 31 | 32 |
| Jay Capella | Film | 33 | 34 | 35 | 36 | 37 | 38 | 39 | 40 |
|  | DVD | 41 | 42 | 43 | 44 | 45 | 46 | 47 | 48 |

FIG. 3

MULTI-LEVEL NAMING OF GROUPED DATA

BACKGROUND OF THE INVENTION

Existing spreadsheet applications allow at most one header row and one header column to be associated with a group or table of cells, wherein values of the header cells may be employed to reference one or more associated cells. FIG. 1 illustrates an example of a structure of a table. Table 100 includes a header row 102, a header column 104, and five rows 106(a) and four columns 106(b) of body cells.

FIG. 2A illustrates an example of a data table 200. FIG. 2B illustrates address tabs with data table 200. Table 200 includes a row of column header cells (row 1), a column of row header cells (column A), and five body rows and three body columns (that span range B2:D6). Like address tabs, header cell values may be employed to refer to corresponding body rows or body columns. For example, in table 200 "Orange Optimism" refers to body cell C5, "Liberty" refers to the body row that spans cells B3:D3, and "Apple" refers to the body column that spans cells B2:B6.

In existing spreadsheet applications, a header cell always refers to a single corresponding body row or body column. A header cell refers to a single body row or body column even if it is merged with a neighboring header cell. In FIG. 2C, the header cells associated with columns B and C in FIGS. 2A and 2B have been merged into a single header cell. In this case, header cell "Apple Orange" in a typical prior art spreadsheet application would refer to a single body column, e.g., the body column that spans cells B2:B6.

BRIEF DESCRIPTION OF THE DRAWINGS

Various embodiments of the invention are disclosed in the following detailed description and the accompanying drawings.

FIG. 2A illustrates an example of a data table.

FIG. 2B illustrates address tabs with the data table of FIG. 2A.

FIG. 2C illustrates an example of a data table with a merged header cell.

FIG. 3 illustrates an embodiment of a table that has multiple header levels in both dimensions.

DETAILED DESCRIPTION

Figure 1:
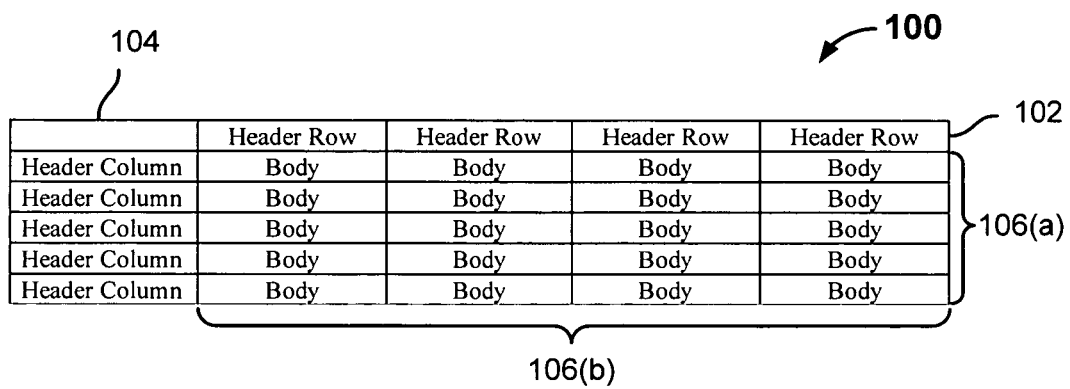
FIG. 1 illustrates an example of a structure of a table.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well as any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

As disclosed herein, a group or table of cells may include one or more header levels in one or more dimensions. Multiple adjacent header cells in a given header level may be merged together to group a table in a desired manner. As disclosed herein, in some embodiments, a merged header cell is used to refer to all body rows or body columns spanned by the merged header cell. In such cases, for example, the merged header cell "Apple Orange" in FIG. 2C refers to both spanned body columns, i.e., cell range B2:C6. As further disclosed, header cells of multiple header levels may be employed to refer to one or more corresponding body cells of a table.

FIG. 3 illustrates an embodiment of a table 300 that has multiple header levels in both (row and column) dimensions. Specifically, table 300 includes three rows of column headers, two columns of row headers, and six body rows and eight body columns. The three levels of column headers hierarchically group the body columns, and the two levels of row headers hierarchically group the body rows. As depicted, header cells of some header levels comprise merged header cells that span (and may be used to refer to) multiple body rows or body columns.

One or more header cell values of the various header levels may be used to refer to the body cells of the table. For example, "North America" refers to the first four body columns, "Asia Distribution" refers to the last two body columns, "North America Marketing 2004" refers to the second body column, "Cinemaniac" refers to the first two body rows, "Jay Capella DVD" refers to the last body row, "Asia Distribution 2004 Cinemaniac Internet" refers to the body cell with a value of 16, "Cinemaniac Asia" refers to the first two rows of the last four body columns in the table, etc. In some embodiments, header cell values may be specified in any order in a reference. For example, "Cinemaniac Distribution Asia Internet 2004" and "Asia Distribution 2004 Cinemaniac Internet" refer to the same body cell, "DVD Jay Capella" and "Jay Capella DVD" refer to the same body row, etc.

In some embodiments, higher level header cells must be specified when referencing lower level divisions of the table. In such cases, for example, "Marketing" is not a valid reference and needs to be disambiguated as "North America Marketing" or "Asia Marketing". In alternative embodiments, higher level header cells need not be specified when referencing lower level divisions of the table. In such cases, for example, "Marketing" may be a valid reference and refer to the first and second body columns and/or the fifth and sixth body columns in various embodiments.

As is apparent from some of the given examples, cell references comprising header cell values provide meaningful descriptions of the data that is being referred to, e.g., if the header cell values are appropriately selected, with multiple header levels allowing more specific descriptions. Cell references specified by header cell values may be employed in any appropriate context such as in formulas, data source definitions, etc.

Figure 4:
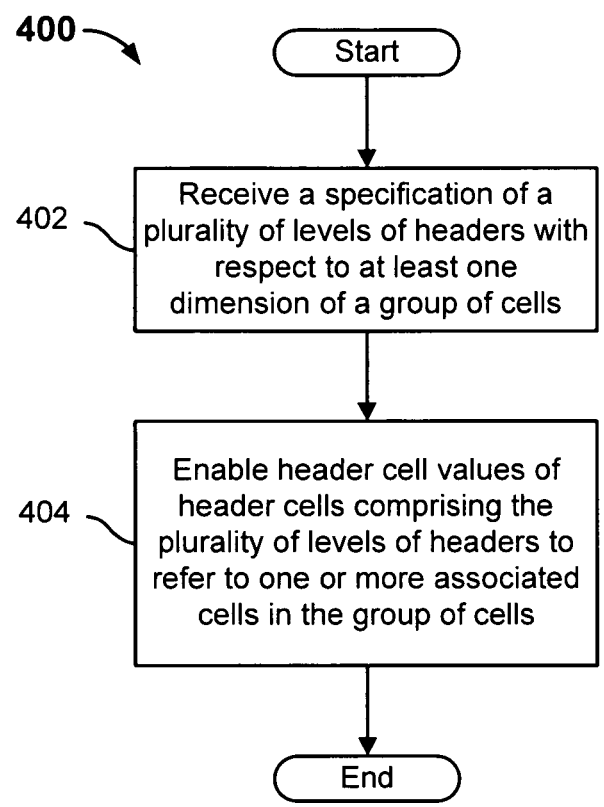
FIG. 4 illustrates an embodiment of a process for referring to one or more cells.

FIG. 4 illustrates an embodiment of a process for referring to one or more cells. Process 400 starts at 402 at which a specification of a plurality of levels of headers with respect to at least one dimension of a group of cells is received. At 404, header cell values of header cells comprising the plurality of levels of headers are enabled to refer to one or more associated cells in the group of cells. Process 400 subsequently ends.

Figure 5:
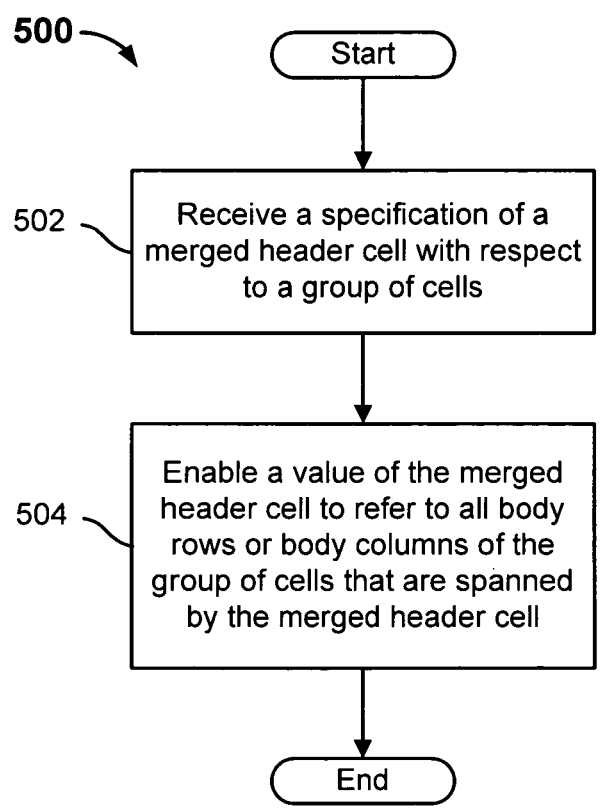
FIG. 5 illustrates an embodiment of a process for referring to one or more cells.

FIG. 5 illustrates an embodiment of a process for referring to one or more cells. Process 500 starts at 502 at which a specification of a merged header cell is received with respect to a group of cells. At 504, a value of the merged header cell is enabled to refer to all body rows or body columns of the group of cells that are spanned by the merged header cell. Process 500 subsequently ends.

Figure 6:
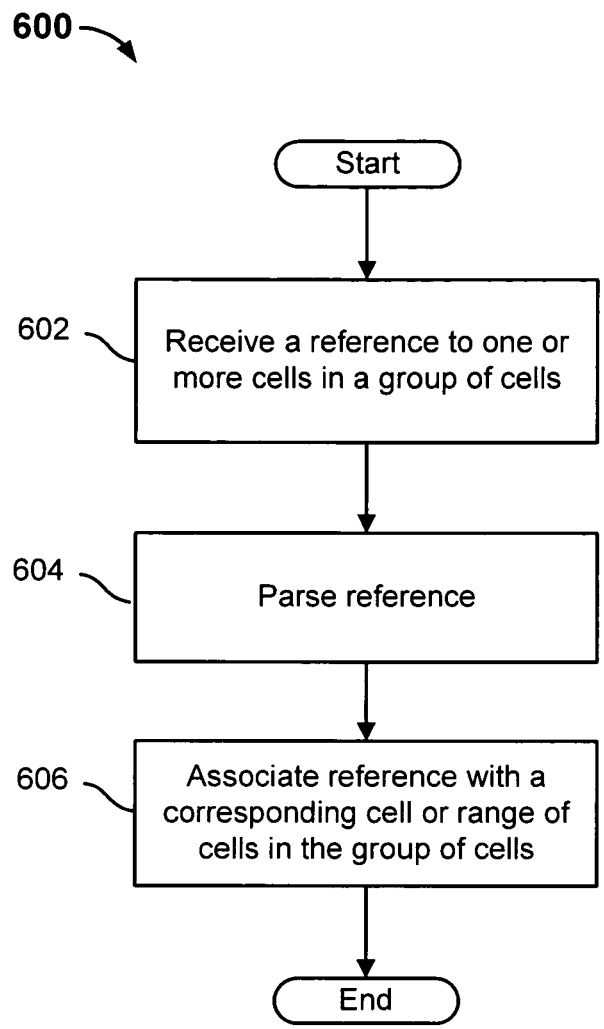
FIG. 6 illustrates an embodiment of a process for interpreting a reference.

FIG. 6 illustrates an embodiment of a process for interpreting a reference. Process 600 starts at 602 at which a reference to one or more cells in a group of cells is received. In some embodiments, the reference comprises one or more header cell values of one or more header levels of the group of cells. At 604, the reference received at 602 is parsed. In some embodiments, parsing at 604 includes matching values included in the reference to header cell values included in the group of cells to identify which header cell values are included in the reference. In some embodiments, 604 includes determining a hierarchy of matching header cell values in at least one dimension and identifying a header cell value corresponding to a lowest level in the hierarchy. At 606, the reference is associated with a corresponding cell or range of cells in the group of cells. In some embodiments, the corresponding cell or range of cells comprises the cell or range of cells spanned by a lowest level header cell value included in the reference in one or more dimensions. Process 600 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. At least one computer program product for processing spreadsheet data, the computer program product being embodied in a non-transitory computer readable storage medium and comprising computer instructions for:
providing a header cell comprising a header cell reference value, wherein the header cell spans two or more rows or columns, wherein the header cell reference value references a cell range of the two or more rows or columns spanned by the header cell; and
performing a formula in a spreadsheet on the cell range of the two or more rows or columns spanned by the header cell by referencing the header cell reference value in the formula.

2. The at least one computer program product recited in claim 1, wherein the header cell reference value is configured to be parsed to determine header cell values included in the header cell reference value.

3. The at least one computer program product recited in claim 1, wherein a plurality of levels of header cells comprises the header cell, wherein the plurality of levels of header cells hierarchically groups body rows or body columns of the group of cells.

4. The at least one computer program product recited in claim 3, wherein a plurality of header cell values of the plurality of levels of header cells may be specified in any order to refer to associated body cells.

5. The at least one computer program product recited in claim 4, wherein higher level header cell values of the plurality of header cells values are specified with lower level header cell values of the plurality of header cells values to refer to lower level divisions of the group of cells.

6. The at least one computer program product recited in claim 4, wherein higher level header cell values of the plurality of header cells values are not specified with lower level header cell values of the plurality of header cells values to refer to lower level divisions of the group of cells.

7. At least one computer program product for processing spreadsheet data, the computer program product being embodied in a non-transitory computer readable storage medium and comprising computer instructions for:
merging a plurality of header cells of a group of cells, wherein each header cell of the plurality of header cells:
spans a body row or a body column of the group of cells; and
comprises a header cell value and a header cell reference value, wherein the header cell reference value refers to the body row or the body column spanned by the header cell;
wherein merging the plurality of header cells comprises:
generating a merged header cell spanning all body rows, body columns, or both of the plurality of header cells that are merged, wherein the merged header cell comprises:
a merged header cell value that comprises a concatenation of the header cell values of each header cell of the plurality of header cells; and
a merged header cell reference value that refers to the body rows or the body columns spanned by each header cell of the plurality of header cells.

8. A system for processing spreadsheet data, comprising:

at least one processor configured to perform instructions that cause:

provide a header cell comprising a header cell reference value, wherein the header cell spans two or more rows or columns, wherein the header cell reference value references a cell range of the two or more rows or columns spanned by the header cell; and performing a formula or using a data source definition in a spreadsheet on the cell range of the two or more rows or columns spanned by the header cell by referencing the header cell reference value in the formula or the data source definition; and at least one memory coupled to the at least one processor and configured to provide the at least one processor with the instructions.

9. The system recited in claim 8, wherein the header cell reference value is configured to be parsed to determine header cell values included in the header cell reference value.

10. The system recited in claim 8, wherein a plurality of levels of header cells comprises the header cell, wherein the plurality of levels of header cells hierarchically groups body rows or body columns of the group of cells.

11. The system recited in claim 10, wherein higher level header cell values of a plurality of header cells values of the plurality of levels of header cells are specified with lower level header cell values of the plurality of header cells values to refer to lower level divisions of the group of cells.

12. A system for processing spreadsheet data, comprising:

at least one processor configured to perform instructions that cause:

merging a plurality of header cells of a group of cells, wherein each header cell of the plurality of header cells:

spans a body row or a body column of the group of cells; and comprises a header cell value;

wherein merging the plurality of header cells comprises:

generating a merged header cell spanning all body rows, body columns, or both of the plurality of header cells that are merged, wherein the merged header cell comprises a merged header cell value, wherein the merged header cell value comprises a concatenation of the header cell values of each header cell of the plurality of header cells; and at least one memory coupled to the at least one processor and configured to provide the at least one processor with the instructions.

13. A method for processing spreadsheet data, comprising:

providing a header cell comprising a header cell reference value, wherein the header cell spans two or more rows or columns, wherein the header cell reference value references a cell range of the two or more rows or columns spanned by the header cell; and performing a formula or using a data source definition in a spreadsheet on the cell range of the two or more rows or columns spanned by the header cell by referencing the header cell reference value in the formula or the data source definition.

14. The method recited in claim 13, wherein the header cell reference value is configured to be parsed to determine header cell values included in the header cell reference value.

15. The method recited in claim 13, wherein a plurality of levels of header cells comprises the header cell, wherein the plurality of levels of header cells hierarchically groups body rows or body columns of the group of cells.

16. The method recited in claim 13, wherein higher level header cell values of a plurality of header cells values of the plurality of levels of header cells are specified with lower level header cell values of the plurality of header cells values to refer to lower level divisions of the group of cells.

17. A method for processing spreadsheet data, comprising:

merging a plurality of header cells of a group of cells, wherein each header cell of the plurality of header cells:

spans a body row or a body column of the group of cells; and comprises a header cell reference value that refers to the body row or the body column spanned by the header cell;

wherein merging the plurality of header cells comprises:

merging each header cell reference value of each header cell of the plurality of header cells to generate a merged header cell reference value that references a cell range of the body rows or the body columns spanned by each header cell of the plurality of header cells; and generating a merged header cell spanning all body rows, body columns, or both of the plurality of header cells that are merged, wherein the merged header cell comprises the merged header cell reference value.

18. The at least one computer program product recited in claim 7, wherein when the merged header cell reference value is used in a spreadsheet function, cells of the body rows or cells of the body columns spanned by each header cell of the plurality of header cells are referenced.

19. The system recited in claim 12, wherein the at least one processor is configured to perform an instruction that causes performing a formula or using a data source definition in a spreadsheet on all values in the body rows or the body columns spanned by each header cell of the plurality of header cells by referencing the merged header cell reference value in the formula or the data source definition.

20. The method recited in claim 17, comprising receiving a specification of the plurality of header cells to be merged.

* * * * *